(12) United States Patent
Todd

(10) Patent No.: US 10,719,480 B1
(45) Date of Patent: Jul. 21, 2020

(54) EMBEDDED DATA VALUATION AND METADATA BINDING

(71) Applicant: EMC IP Holding Company LLC, Hopkinton, MA (US)

(72) Inventor: Stephen Todd, Shrewsbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 648 days.

(21) Appl. No.: 15/353,947

(22) Filed: Nov. 17, 2016

(51) Int. Cl.
G06F 16/00 (2019.01)
G06F 16/16 (2019.01)
G06F 16/13 (2019.01)

(52) U.S. Cl.
CPC ............ G06F 16/164 (2019.01); G06F 16/13 (2019.01)

(58) Field of Classification Search
CPC ............................... G06F 16/164; G06F 16/13
USPC ......................................................... 707/803
See application file for complete search history.

(56) References Cited

U.S. PATENT DOCUMENTS

| | | | |
|---|---|---|---|
| 6,715,145 B1 | 3/2004 | Bowman-Amuah | |
| 6,957,227 B2 | 10/2005 | Fogel et al. | |
| 7,574,426 B1 | 8/2009 | Ortega | |
| 7,580,848 B2 | 8/2009 | Eder | |
| 7,752,195 B1 | 7/2010 | Hohwald et al. | |
| 7,890,451 B2 | 2/2011 | Cancel et al. | |
| 7,970,729 B2 | 6/2011 | Cozzi | |
| 8,468,244 B2 * | 6/2013 | Redlich | G06Q 10/06 709/225 |
| 8,561,012 B1 | 10/2013 | Holler et al. | |
| 9,262,451 B1 | 2/2016 | Singh et al. | |
| 9,384,226 B1 | 7/2016 | Goel et al. | |
| 9,465,825 B2 | 10/2016 | Nelke et al. | |
| 9,606,828 B2 | 3/2017 | Ghosh et al. | |
| 9,851,997 B2 | 12/2017 | Gough et al. | |
| 10,210,551 B1 * | 2/2019 | Todd | G06Q 30/0278 |
| 10,324,962 B1 * | 6/2019 | Todd | G06F 16/31 |
| 2001/0042062 A1 | 11/2001 | Tenev et al. | |
| 2002/0161800 A1 * | 10/2002 | Eld | G06F 40/169 715/205 |
| 2004/0122646 A1 | 6/2004 | Colossi et al. | |
| 2005/0182739 A1 | 8/2005 | Dasu et al. | |
| 2007/0005383 A1 | 1/2007 | Kasower | |
| 2008/0215170 A1 * | 9/2008 | Milbrandt | H04L 65/604 700/94 |
| 2009/0018996 A1 | 1/2009 | Hunt et al. | |
| 2009/0077043 A1 * | 3/2009 | Chang | G06Q 10/10 |

(Continued)

OTHER PUBLICATIONS

U.S. Appl. No. 14/863,783 filed in the name of Stephen Todd et al. Sep. 24, 2015 and entitled "Unstructured Data Valuation."

(Continued)

*Primary Examiner* — Hanh B Thai
(74) *Attorney, Agent, or Firm* — Ryan, Mason & Lewis, LLP

(57) ABSTRACT

A method performed by one or more processing devices that are part of a data storage environment includes the following steps. A data set is obtained. Valuation metadata generated for the data set is obtained. The valuation metadata is bound to the data set. The data set and the bound valuation metadata are processed as a single data storage item within the data storage environment. Processing may include, but is not limited to, storing, scaling, accessing, migrating, and deleting.

20 Claims, 5 Drawing Sheets

(56) References Cited

U.S. PATENT DOCUMENTS

| | | | |
|---|---|---|---|
| 2009/0115901 A1* | 5/2009 | Winter | H04N 5/262 348/565 |
| 2009/0282089 A1 | 11/2009 | Lakshmanachar et al. | |
| 2009/0327921 A1 | 12/2009 | Holm-Peterson et al. | |
| 2010/0094685 A1 | 4/2010 | Young | |
| 2010/0153282 A1* | 6/2010 | Graham | G06Q 10/10 705/310 |
| 2010/0153324 A1 | 6/2010 | Downs et al. | |
| 2011/0055699 A1* | 3/2011 | Li | G06F 16/951 715/709 |
| 2011/0078603 A1 | 3/2011 | Koomullil | |
| 2012/0084261 A1 | 4/2012 | Parab | |
| 2012/0116911 A1 | 5/2012 | Irving et al. | |
| 2012/0123994 A1 | 5/2012 | Lowry et al. | |
| 2012/0310684 A1 | 12/2012 | Carter | |
| 2012/0323843 A1 | 12/2012 | Bice et al. | |
| 2013/0036091 A1 | 2/2013 | Provenzano et al. | |
| 2013/0055042 A1 | 2/2013 | Al Za'noun et al. | |
| 2013/0073594 A1 | 3/2013 | Jugulum et al. | |
| 2013/0110842 A1 | 5/2013 | Donneau-Golencer et al. | |
| 2013/0151423 A1 | 6/2013 | Schmidt et al. | |
| 2013/0227236 A1* | 8/2013 | Flynn | G11C 16/26 711/165 |
| 2014/0052489 A1 | 2/2014 | Prieto | |
| 2014/0324856 A1 | 10/2014 | Lahiani et al. | |
| 2015/0046532 A1* | 2/2015 | Szczytowski | G06F 11/3086 709/204 |
| 2015/0104003 A1* | 4/2015 | Holman | G06F 21/62 380/28 |
| 2015/0106947 A1* | 4/2015 | Holman | G06F 21/62 726/26 |
| 2015/0120555 A1 | 4/2015 | Jung et al. | |
| 2015/0121280 A1* | 4/2015 | Slatner | G06Q 10/10 715/772 |
| 2015/0134591 A1 | 5/2015 | Staeben et al. | |
| 2015/0193145 A1* | 7/2015 | Johnson | G06F 16/164 360/49 |
| 2015/0293974 A1 | 10/2015 | Loo | |
| 2016/0055184 A1 | 2/2016 | Fokoue-Nkoutche et al. | |
| 2016/0072741 A1* | 3/2016 | Hamilton | H04L 51/04 709/206 |
| 2016/0110819 A1 | 4/2016 | Abramowitz | |
| 2016/0144194 A1* | 5/2016 | Roothans | A61N 1/37247 607/45 |
| 2016/0196311 A1 | 7/2016 | Wang et al. | |
| 2016/0224430 A1 | 8/2016 | Long et al. | |
| 2016/0259693 A1* | 9/2016 | Sundararaman | G06F 11/1458 |
| 2017/0228398 A1* | 8/2017 | Troppe | G06F 16/58 |
| 2017/0236060 A1 | 8/2017 | Ignatyev | |
| 2017/0293655 A1 | 10/2017 | Ananthanarayanan et al. | |

OTHER PUBLICATIONS

U.S. Appl. No. 15/136,327 filed in the name of Stephen Todd et al. Apr. 22, 2016 and entitled "Calculating Data Value Via Data Protection Analytics."

U.S. Appl. No. 15/135,790 filed in the name of Stephen Todd et al. Apr. 22, 2016 and entitled "Data Valuation at Content Ingest."

U.S. Appl. No. 14/998,112 filed in the name of Stephen Todd et al. Dec. 24, 2015 and entitled "Data Valuation Based on Development and Deployment Velocity."

U.S. Appl. No. 15/072,557 filed in the name of Stephen Todd et al. Mar. 17, 2016 and entitled "Metadata-Based Data Valuation."

U.S. Appl. No. 15/135,817 filed in the name of Stephen Todd et al. Apr. 22, 2016 and entitled "Data Value Structures."

Doug Laney, "The Economics of Information Assets," The Center for Infonomics, http://www.smarter-companies.com/group/icpractitioners/forum/topics/abstract-and-slides-for-today-s-session-on-infonomics-by-doug, Sep. 13, 2011, 22 pages.

U.S. Appl. No. 14/973,096 filed in the name of Stephen Todd et al. Dec. 17, 2015 and entitled "Data Set Valuation for Service Providers."

U.S. Appl. No. 14/973,141 filed in the name of Stephen Todd et al. Dec. 17, 2015 and entitled "Automated Data Set Valuation and Protection."

U.S. Appl. No. 14/973,178 filed in the name of Stephen Todd Dec. 17, 2015 and entitled "Timeliness Metrics and Data Valuation in Distributed Storage Systems."

U.S. Appl. No. 15/073,741 filed in the name of Stephen Todd et al. Mar. 18, 2016 and entitled "Data Quality Computation for Use in Data Set Valuation."

U.S. Appl. No. 15/236,684 filed in the name of Stephen Todd Aug. 15, 2016 and entitled "Calculating Data Relevance for Valuation."

U.S. Appl. No. 13/923,791 filed in the name of Stephen Todd et al. Jun. 21, 2013 and entitled "Data Analytics Computing Resource Provisioning."

U.S. Appl. No. 14/744,886 filed in the name of Marina Zeldin et al. Jun. 19, 2015 and entitled "Infrastructure Trust Index."

Wikipedia, "Value Chain," https://en.wikipedia.org/w/index.php?title=Value_chain&printable=yes, Jun. 6, 2016, 7 pages.

Nicole Laskowski, "Six Ways to Measure the Value of Your Information Assets," Tech Target, http://searchcio.techtarget.com/feature/Six-ways-to-measure-the-value-of-your-information-assets?vgnextfmt=print, May 8, 2014, 3 pages.

R. Shumway et al., "White Paper: Infonomics in Practice: Realizing the True Value of Business Data," Cicero Group, http://cicerogroup.com/app/uploads/2015/09/Infonomics-in-Practice.pdf, 2015, 4 pages.

E. Kupiainen et al., "Why Are Industrial Agile Teams Using Metrics and How Do They Use Them?" Proceedings of the 5th International Workshop on Emerging Trends in Software Metrics, Jun. 2014, 7 pages.

D. Hartmann et al., "Appropriate Agile Measurement: Using Metrics and Diagnostics to Deliver Business Value," Proceedings of the Conference on AGILE, Jul. 2006, 6 pages.

T. Lehtonen et al., "Defining Metrics for Continuous Delivery and Deployment Pipeline," Proceedings of the 14th Symposium on Programming Languages and Software Tools, Oct. 2015, 16 pages.

\* cited by examiner

400

410

420

510

OBJECT

```
ObjectID object = System.NewObject();
object.storeFile("FileA");
object.addkey("Cost", "100");
object.close();
```

520

FILE

```
File f = open("FileA");
Database d = open ("Valuation");
f.write(stream);
d.insert("FileA", cost, 100);
f.close();
d.close();
```

700

720

800

EMBEDDED DATA VALUATION AND METADATA BINDING

FIELD

The field relates generally to data processing and, more particularly, to data set valuation techniques.

BACKGROUND

The evolution of content management has seen a continual rise in the importance of metadata, i.e., data about the content. Over the years, metadata has included data such as file sizes, file types, file permissions, etc. As companies begin to buy, sell, insure, and/or otherwise monetize content, the data management industry has started to create a new form of metadata that is value-based, i.e., valuation metadata. Valuation algorithms allow owners of content to associate economic or business value to their data assets. This value can then potentially be used as input to a variety of business functions.

By way of one example only, one business function includes insuring data assets against loss. Insuring valuable data against loss (e.g., breach or corruption) has become an important part of risk management for entities that store and/or manage data for clients. Since client data is often stored in cloud computing platforms, and thus susceptible to online breach by identity thieves and other actors involved in illicit activities, insuring the heavy financial risk faced by an entity that maintains client data has become a necessity. The value placed on a data asset determines the cost of insuring the data. Of course, valuation of data assets of an entity can be useful in many other business functions and data insurance is just one of many examples.

Such valuation data serves as important metadata that can be considered when making decisions about the content that is valued. However, managing such metadata can be a complex matter for an entity. Accordingly, it is realized that techniques for managing such metadata are important.

SUMMARY

Embodiments of the invention provide data valuation management techniques comprising metadata binding functionality and embedded valuation.

For example, in one embodiment, a method performed by one or more processing devices that are part of a data storage environment comprises the following steps. A data set is obtained. Valuation metadata generated for the data set is obtained. The valuation metadata is bound to the data set. The data set and the bound valuation metadata are processed as a single data storage item within the data storage environment.

Advantageously, illustrative embodiments provide techniques for binding valuation metadata to the content for which the valuation metadata is generated so that the combined content and metadata is processed (e.g., stored, accessed, migrated, scaled, deleted, etc.) as a single data storage item (e.g., a single data object with a unique object identifier). Furthermore, the metadata binding functionality can be performed with valuation algorithms running as background tasks at the point where the content is actually being stored in the data storage environment.

These and other features and advantages of the invention will become more readily apparent from the accompanying drawings and the following detailed description.

DETAILED DESCRIPTION

Illustrative embodiments may be described herein with reference to exemplary cloud infrastructure, data repositories, data centers, data processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "cloud infrastructure," "data repository," "data center," "data processing system," "computing system," "data storage system," "data lake," and the like as used herein are intended to be broadly construed so as to encompass, for example, private and/or public cloud computing or storage systems, as well as other types of systems comprising distributed virtual infrastructure. However, a given embodiment may more generally comprise any arrangement of one or more processing devices.

As used herein, the following terms and phrases have the following illustrative meanings:

"valuation" as utilized herein is intended to be broadly construed so as to encompass, for example, a computation and/or estimation of something's worth or value; in this case, data valuation is a computation and/or estimation of the value of a data set for a given context;

"context" as utilized herein is intended to be broadly construed so as to encompass, for example, surroundings, circumstances, environment, background, settings, characteristics, qualities, attributes, descriptions, and/or the like, that determine, specify, and/or clarify something; in this case, for example, context is used to determine a value of data;

"client" as utilized herein is intended to be broadly construed so as to encompass, for example, a customer or end user of a data storage system or some other form of cloud computing platform; the client accesses the platform via one or more client processing devices;

"structured data" as utilized herein is intended to be broadly construed so as to encompass, for example, data that resides in fixed fields within a document, record or file, e.g., data contained in relational databases and spreadsheets; and "unstructured data" as utilized herein is intended to be broadly construed so as to encompass, for example, data that is not considered structured data (in which case, some "semi-structured" data asset may also be considered unstructured data), e.g., documents, free form text, images, etc.; and "metadata" as utilized herein is intended to be broadly construed so as to encompass, for example, data that describes other data, i.e., data about other data.

Figure 1:
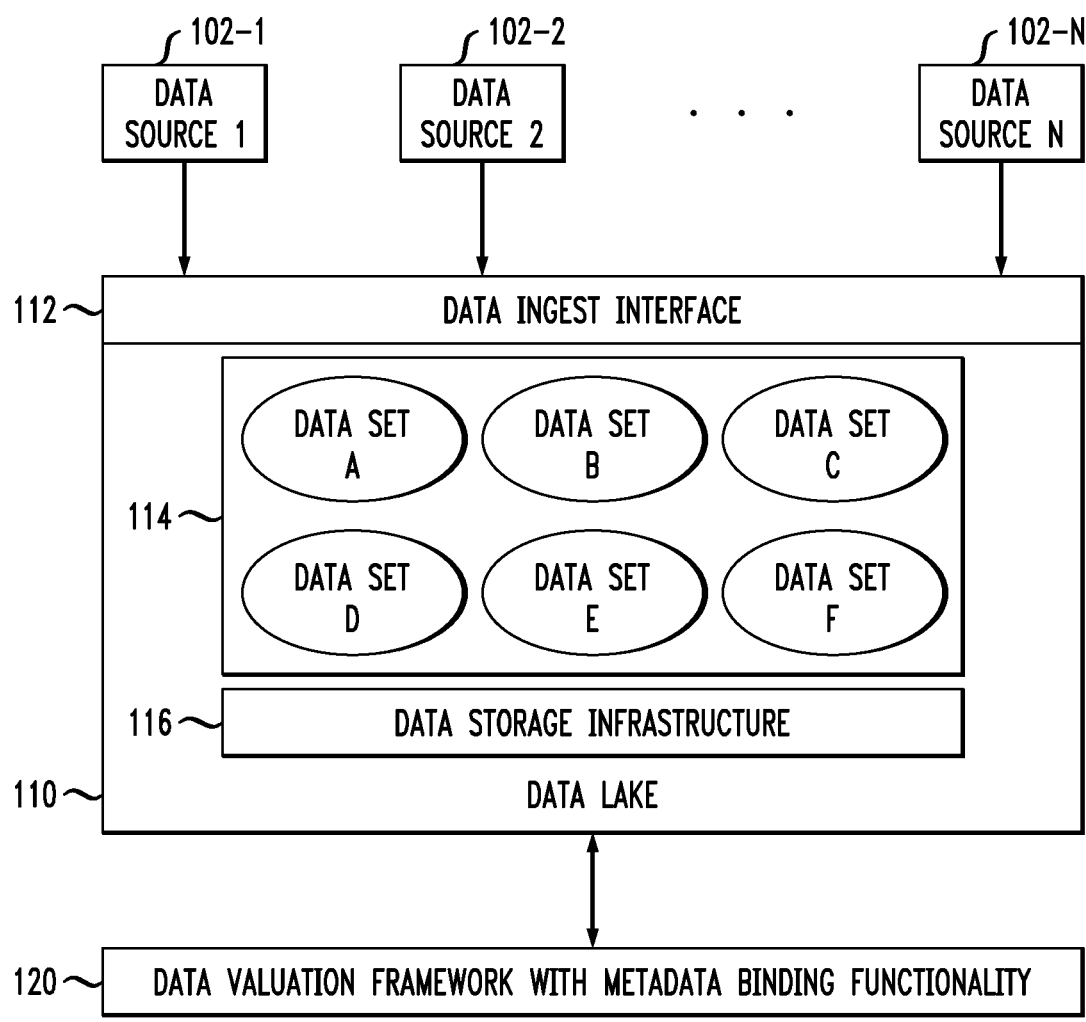
FIG. 1 illustrates a data storage system environment with a data valuation framework with metadata binding functionality, according to an embodiment of the invention.

FIG. 1 illustrates a data storage system environment in which a data valuation framework with metadata binding functionality according to illustrative embodiments is implemented. As shown, in data storage system environment 100 (which may be implemented as a cloud computing platform in an illustrative embodiment), data sources 102-1, 102-2, . . . , 102-N provide data to data storage system 110 through a data ingest interface 112. Data storage system 110 may be considered a data lake. The term "data lake" as utilized herein is intended to be broadly construed so as to encompass, for example, a data repository that stores data without optimization for particular predetermined types of analysis or other processing. For example, a data lake can be configured to store unstructured data in a manner that facilitates flexible and efficient utilization of the stored data to support processing tasks that may be at least partially unknown or otherwise undefined at the time of data storage. This is in contrast to so-called data warehouses or data marts, which generally store structured data in accordance with particular predefined sets of data attributes. Moreover, a data lake in some embodiments can provide the ability to deal with flexible combinations of a wide variety of different types of data. A data lake can also store any combination of structured data and unstructured data from data sources 102-1, 102-2, . . . , 102-N.

In illustrative embodiments, one or more of the data sources 102-1, 102-2, . . . , 102-N may provide streaming data (i.e., data streams), non-streaming data, or combinations thereof. The data storage system 110 comprises a plurality of data sets 114 (data sets A-F) that are stored on data storage infrastructure 116. The data sets 114 comprise the data from the data sources 102 (e.g., data files), but can also include other data. The data sets 114 may each have their own domain-specific data (e.g., customer data, employment data, credit data, etc.) corresponding to one or more of data sources 102-1, 102-2, . . . , 102-N. Data storage infrastructure 116 may comprise one or more compute elements (e.g., servers), network elements (e.g., switches, routers) and/or storage elements (e.g., storage devices, storage arrays). Data storage system 110 can be part of a data center managed by a service provider.

The value of data, such as the data from data sources 102-1, 102-2, . . . , 102-N stored as data sets 114, is calculated by data valuation framework 120. As will be explained in detail, illustrative embodiments utilize one or more valuation metrics to value the data. As will be described below in detail, a data valuation framework is configured to provide metadata binding functionality to bind valuation metadata to the content being valued.

Figure 2:
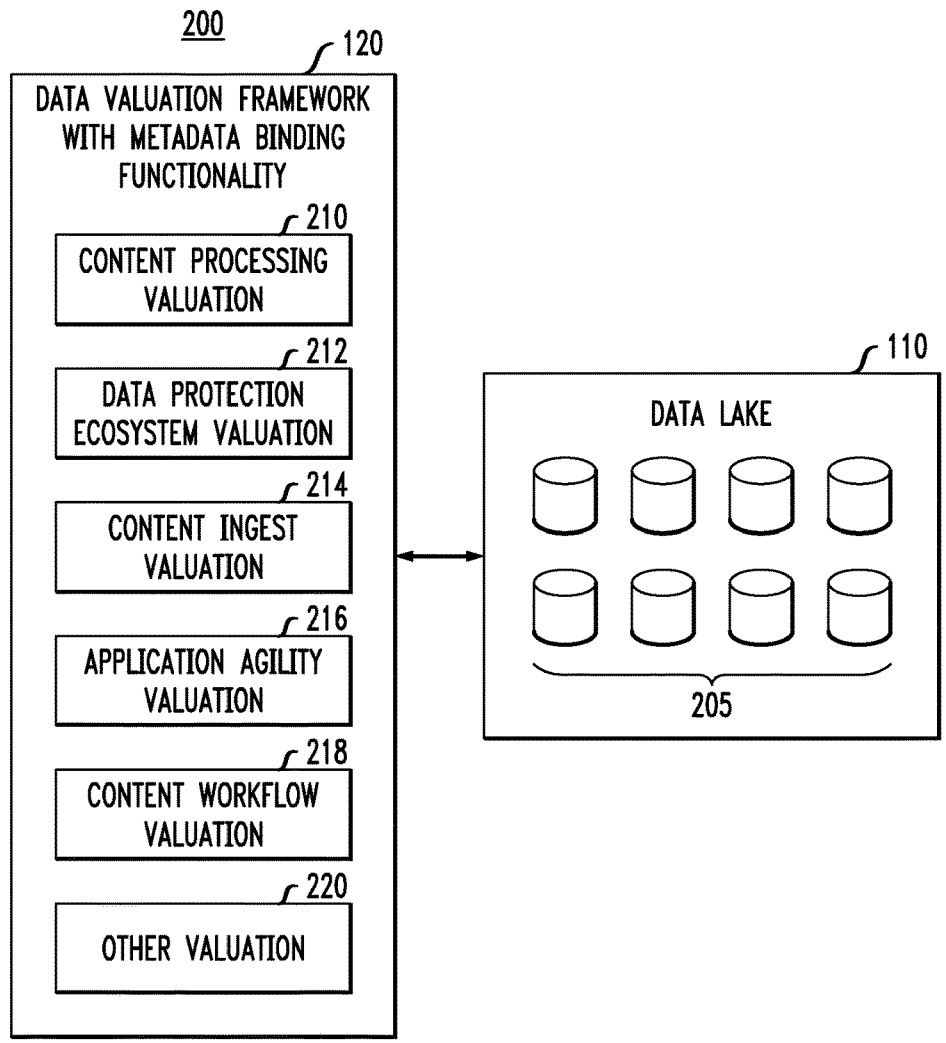
FIG. 2 illustrates a data lake environment with a data valuation framework with metadata binding functionality, according to an embodiment of the invention.

FIG. 2 illustrates a data lake environment 200 with a data valuation framework with metadata binding functionality 120, according to an embodiment of the invention. More particularly, FIG. 2 illustrates a plurality of data valuation algorithms 210 through 220 that can be implemented by data valuation framework 120 for data 205 stored in data lake 110. Each of the data valuation techniques depicted in FIG. 2 are explained as follows:

Content processing valuation algorithm 210 uses parsing algorithms (e.g. natural language processing (NLP), lemmatization, tokenization, etc.) to generate data relevance scores (using, for example, cosine distance ratings between zero and one). More particularly, illustrative embodiments use a variety of techniques to create domain specific tokens for unstructured content that facilitate a data valuation framework. By way of one example, content processing valuation techniques as described in U.S. Ser. No. 14/863,783, filed on Sep. 24, 2015 and entitled "Unstructured Data Valuation," the disclosure of which is incorporated by reference herein in its entirety, can be implemented as part of algorithm 210.

Data protection ecosystem valuation algorithm 212 can not only perform offline parsing to value data but can also leverage rich data protection metadata (e.g., backup schedules, versions, application knowledge, etc.) to further understand the business investment being made for the data being protected. By way of one example, data protection valuation techniques as described in U.S. Ser. No. 15/136,327, filed on Apr. 22, 2016 and entitled "Calculating Data Value Via Data Protection Analytics," the disclosure of which is incorporated by reference herein in its entirety, can be implemented as part of algorithm 212.

Content ingest valuation algorithm 214 allows for immediate valuation (e.g., as part of a data ingest interface) to be run as content streams into a system using a real-time streaming framework such as the Apache™ Storm framework (available from the Apache Software Foundation, Los Angeles, Calif.). By way of one example, content ingest valuation techniques as described in U.S. Ser. No. 15/135, 790, filed on Apr. 22, 2016 and entitled "Data Valuation at Content Ingest," the disclosure of which is incorporated by reference herein in its entirety, can be implemented as part of algorithm 214. Note that, as illustratively depicted in FIG. 1, the data ingest interface 112 and data valuation framework 120 are shown as separate blocks. However, it is to be understood that the valuation framework 120, or at least some portion thereof, can also be located within the data ingest interface 112 in one or more illustrative embodiments.

Application agility algorithm 216 measures the speed at which an organization can develop, test, and deploy application programs (applications), as well as measure rates at which newly deployed applications generate fresh and unique data. By way of one example, application agility valuation techniques as described in U.S. Ser. No. 14/998, 112, filed on Dec. 24, 2015 and entitled "Data Valuation Based on Development and Deployment Velocity," the disclosure of which is incorporated by reference herein in its entirety, can be implemented as part of algorithm 216.

Content workflow valuation algorithm 218 records the workflow and usage of the content (e.g., which data scientists use which tools to generate which data sets predicting a specific economic value) and assign value to a piece of content based on such context. By way of examples, content workflow valuation techniques as described in U.S. Ser. No. 15/072,557, filed on Mar. 17, 2016 and entitled "Metadata-based Data Valuation" and/or U.S. Ser. No. 15/135,817, filed on Apr. 22, 2016 and entitled "Data Value Structures," the disclosures of which are incorporated by reference herein in their entireties, can be implemented as part of algorithm 218.

Other valuation algorithms 220 can be used to provide further valuation metrics. By way of non-limiting example, one or more of the data valuation models described in D. Laney, "The Economics of Information Assets," The Center for Infonomics, Smarter Companies presentation, September 2011, may be employed as data valuation methodologies used by framework 120. Such valuation models include a set of non-financial models and set of financial models. The non-financial models include: (i) an intrinsic value of information model, which represents a measure of a value of the correctness, completeness, and exclusivity (scarcity) of the data set; (ii) a business value of information model, which represents a measure of a value of the sufficiency and relevance of the data set for specific purposes; and (iii) a performance value of information model, which represents a measure of a value of how the data set affects key business drivers. The financial models include: (i) a cost value of information model, which represents a measure of a value of the cost of losing the data set; (ii) a market value of information model, which represents a measure of a value of the amount that could be obtained by selling or trading the data set; and (iii) an economic value of information model, which represents a measure of a value of how the data set contributes to a financial bottom line.

Each of these above-described valuation techniques typically generates valuation data (values) that are stored in, and thus are accessed from, a valuation repository that resides in association with, but separate from, the actual content itself. For instance, the valuation repository can reside on a storage device or data structure that is geographically or otherwise physically remotely located from the storage device or data structure upon which the content repository resides. Alternatively, the separate devices/data structures of the valuation repository and the content repository can be geographically or otherwise physically collocated. Further, some combination of remote and collocated placement can be employed. Still further, the valuation data and the content can be stored on the same storage device but still remain in functionally separate data structures.

However, in any of the above-mentioned storage arrangements, existing valuation approaches separate the valuation repository and the content repository. It is realized herein that this separation approach has several shortcomings as will now be described.

Figure 3:
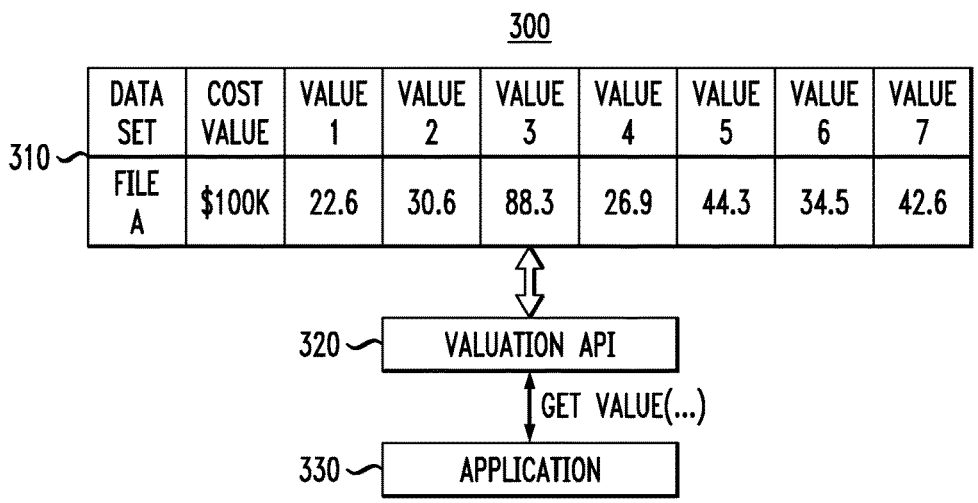
FIG. 3 illustrates tabular storage of valuation metadata, according to an embodiment of the invention.

FIG. 3 illustrates an example of storage and access operations with respect to a valuation repository. As shown in methodology 300 in FIG. 3, a table 310 represents a valuation data structure stored for file A (i.e., file A is considered the content and is stored at a separate content repository). Table 310 shows illustrative values computed for a set of data valuation algorithms (i.e., value 1 is an output value that corresponds to a first valuation algorithm, value 2 is an output value that corresponds to a second valuation algorithm, and so on). Also shown is a cost value which represents a cost to the business associated with obtaining file A (e.g., purchase cost). Note that the valuation algorithms that generate the values 1, 2, . . . , 7 can include valuation techniques such as one or more of valuation algorithms 210 through 220 described above. Note also that one or more of the valuation algorithms can implement valuation criteria that are standard for and/or required by a specific industry (e.g., data insurance industry).

As further shown, a valuation API 320 is configured to fetch a value for file A based on a query from an application program 330. In one non-limiting example, application 330 can be a data insurance quote generation engine, which utilizes the one or more stored values (cost value, value 1, 2, . . . , 7 to determine how file A impacts data insurance premiums.

However, by storing the valuation metadata (cost value, value 1, 2, . . . , 7 in a location (storage device and/or data structure) that is separate from the content, the business runs the risk of permanent separation of the value and the content due to a variety of failure scenarios (e.g., corruption, malware, etc.).

For example, storing the valuation metadata separate from the content creates complexity in terms of permissions for viewing both the metadata itself and the content it references. If care is taken to restrict access to (or knowledge of) a particular file (content), for example, the valuation metadata reveals that such a file exists.

Further, as organizations continue to store millions upon millions of unstructured documents, the metadata repository itself may encounter scaling limits, or the geographic locations of the documents may make such a repository prohibitive.

Also, as content moves between organizations (or potentially outside of organizations or companies), the metadata gets left behind and/or becomes immediately stale/irrelevant.

Still further, as a large enterprise attempts to store data in multiple locations, each of these locations should contain intelligent valuation algorithms that knows how to process the data and update the valuation repository appropriately. The deployment and management of these valuation algorithms in all storage locations becomes problematic. In addition, these locations may be limited in their ability to value data immediately (on ingest) versus after (post-valuation processing).

Illustrative embodiments of the invention provide improved data valuation management techniques that overcome the above and other drawbacks associated with existing approaches. More particularly, illustrative embodiments provide methodologies for binding valuation metadata to the content for which the valuation metadata is generated.

Figures 4, 5A, 5B:
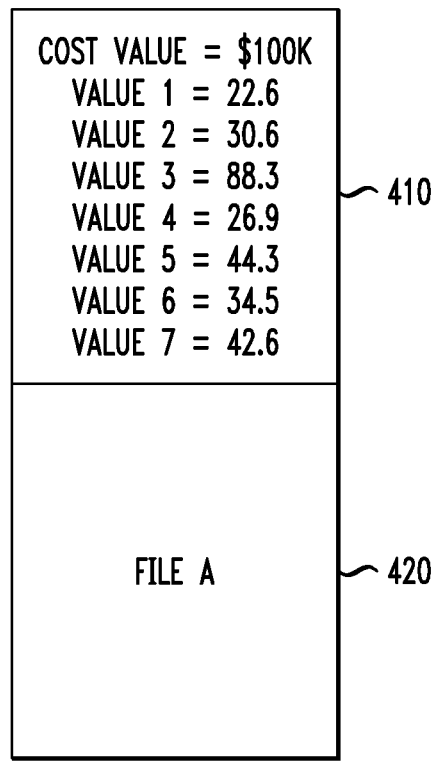
FIG. 4 illustrates metadata binding, according to an embodiment of the invention.
FIG. 5A illustrates a valuation algorithm calling an application programming interface and storing valuation metadata to the same repository as content, according to an embodiment of the invention.
FIG. 5B illustrates a valuation algorithm opening a metadata database separate from a content database to store valuation metadata, according to an embodiment of the invention.

In one illustrative embodiment, object-based metadata techniques are employed for permanent binding of valuation metadata to the content being valued. FIG. 4 illustrates an example of metadata binding whereby the metadata is embedded with the content itself and treated as a single object with its own unique object identifier (ID). By embedded, it is illustratively meant that the valuation metadata is appended to or otherwise bound to the content for which the valuation metadata was generated. Thus, as shown, the metadata associated with file A from table 310 in FIG. 3 (cost value, value 1, 2, . . . , 7 and referred to in FIG. 4 as object metadata 410 is appended to file A referred to as object 420 in FIG. 4. Following the metadata binding operation, the valuation metadata 410 and file A 420 are thereafter advantageously treated as a single object 400 and assigned a unique identifier (e.g., XYZ123). The single object 400 is stored in the content repository, and thus there is no need for a separate valuation repository.

FIG. 5A illustrates a valuation algorithm 510 calling an application programming interface (API) and storing valuation metadata to the same repository as content, according to an embodiment of the invention. As depicted by the exemplary code, a new object is created and stored in the content repository when new content (e.g., file A) is obtained. Then, an object add operation is performed to add valuation metadata (e.g., cost value=$100) to the object created for the stored content when new valuation metadata is obtained. Thus, the code in algorithm 510 calls an API and stores valuation metadata to the exact same repository as the content itself, whereby the metadata and content are bound together and treated as a single object.

In contrast, FIG. 5B illustrates a valuation algorithm 520 that opens a metadata database separate from a content database to store valuation metadata. That is, algorithm 520 illustrates the additional burden of opening up a separate database (database d) to store the valuation metadata when the content is stored in a separate repository as file f.

Given that the valuation metadata and object are now stored in the same repository, e.g., as illustrated by FIG. 4 and FIG. 5A, the approach does not run into the disadvantage of storing the metadata and data in different repositories, and the complexity of one repository being up (accessible) while the other repository is down (not accessible) is no longer an issue. It is to be appreciated that while FIG. 4 and FIG. 5A show metadata binding functionality as an object-oriented storage implementation, alternative embodiments may achieve the metadata binding functionality using other embedding, binding and/or appending techniques.

Furthermore, now that the metadata is bound to the content, in accordance with illustrative embodiments, the access permissions for both the metadata and content can be identical. This solves the problem of having provide complicated permission management between different repositories and/or to somehow segment a separate valuation repository. Note also that illustrative embodiments contemplate the scenario where it is desirable to mask the valuation data so that the content owner cannot see the valuation data. In such a scenario, a variety of more complex access permission implementations can be used, e.g., encrypting the valuation metadata with a key, or using different permission sets for metadata versus content. Thus, in each scenario (i.e., identical access permission, encryption of the valuation metadata, or different access permissions between the content and the valuation metadata), access permission is advantageously coordinated between the content and the valuation metadata within the system.

Also, binding the valuation metadata to the content as part of an object-based solution allows the valuation metadata to scale in an identical fashion to the scalability limits of the overall object store. Additionally, the valuation metadata now picks up the geographic scaling characteristics enjoyed by the content stored in the object store. Storage scaling illustratively refers to the ability to dynamically increase (scale out) or decrease (scale in) storage capacity in a data storage system by respectively adding or removing storage nodes.

As content is moved from one object-based repository to another, the valuation metadata is automatically moved along with the content. This obviates the need to have separate migration events (one for the content and one for the metadata). In addition, there is no issue if the remote system does not have an existing valuation repository; the valuation metadata is unconcerned with separate valuation repositories that may or may not exist on the remote site.

Still further, if a piece of content is destroyed in an object-based storage system, any valuation metadata associated with said content is likewise destroyed. This eliminates the need to delete a piece of content and then perform a second operation to access the valuation repository and remove the corresponding valuation metadata entry.

One of the many advantages of binding valuation metadata with content is it opens the possibility of moving valuation algorithms into the storage system itself. This minimizes the complexity of deploying, maintaining and running valuation algorithms at the server level and offers the potential to completely manage the valuation of data within the storage ecosystem. It also means that the content can flow raw into a storage system without the need for a valuation algorithm gathering and storing valuation metadata.

Figure 6:
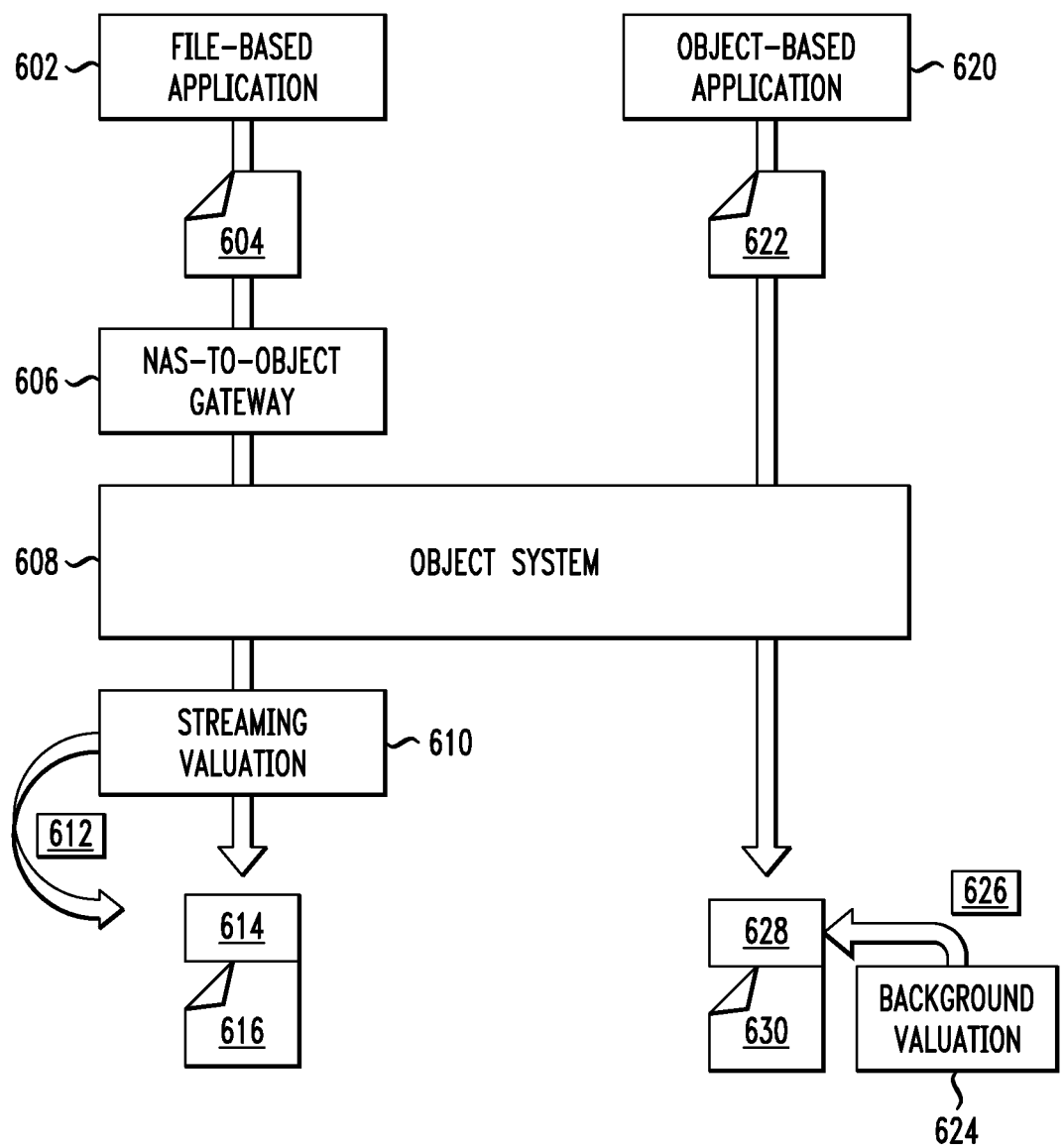
FIG. 6 illustrates a system configured to perform valuation embedded within storage, according to an embodiment of the invention.

FIG. 6 illustrates content flowing into a storage system with embedded valuation algorithms, according to an illustrative embodiment. Now that an approach for binding metadata within a system has been established, as illustrated above in the context of illustrative embodiments, the system itself can run policies for taking action on the content as the valuation metadata is updated. For example, as the value rises, data protection can be increased (e.g., more copies, or encryption applied), and content can be moved geographically if it is determined that the content is valuable to a specific client in a specific location. As the value falls, data can be tiered to slower, cheaper storage, and data can be auto-deleted.

As shown in system 600, content can stream into a storage system using native application APIs (e.g. block APIs or file APIs). This is illustrated by file-based application 602 streaming file 604 via gateway 606 to object storage system 608. In this example, the gateway is a network attached storage (NAS) to object gateway. Such content streams into the system and is valuated 610 in real time (e.g., using techniques described above in the context of content ingest valuation algorithm), metadata 612 is generated and then appended/bound to the content 604 in accordance with illustrative metadata binding techniques described herein, i.e., 614 represents the metadata 612 after it is bound to the content 616 which represents file 604.

Furthermore, content streams (file 622) from an object-based application 620 can alternatively (or additionally) be stored without valuation metadata, and background valuation tasks 624 (one or more of valuation algorithms 210 through 220) within the storage system can create valuation metadata 626 and then append/bind the valuation metadata to the original content in accordance with illustrative metadata binding techniques described herein (e.g., 628 represents metadata 626 and is bound to 630 which represents content 622). Advantageously, the background valuation tasks 624 are considered to be embedded within the data storage environment at a location where the content is being stored. Thus, as mentioned above, this configuration minimizes the complexity of deploying, maintaining and running valuation algorithms and enables management of the valuation of data within the storage ecosystem itself.

As content is updated within the system 600, valuation metadata can be continually updated using either approach (i.e., path formed by 602 through 616 or path formed by 620 through 630). Even if content is not updated, the value of the content may rise or fall based on external factors, and background valuation processes can continually run to determine if these values are fluctuating and updating the metadata accordingly.

Figure 7A:
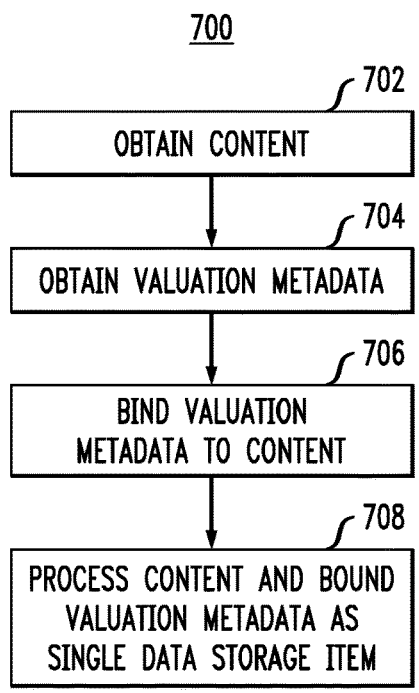
FIG. 7A illustrates a methodology for metadata binding and data management, according to an embodiment of the invention.

FIG. 7A illustrates a methodology for metadata binding, according to an embodiment of the invention. As shown in methodology 700, content is obtained in step 702. This content can be file-based, object-based, or some other data type. The content can be streamed content or non-streamed content. In step 704, valuation metadata associated with the content (from step 702) is obtained. Valuation metadata can be obtained via one or more of the valuation algorithms described herein, e.g., 210 through 220 in FIG. 2, and/or via the valuation steps described above in the context of storage system 600 in FIG. 6. Valuation metadata and content can also be obtained via techniques not expressly mentioned herein.

In step 706, the valuation metadata is bound to the content. This may be via the techniques described above in the context of FIG. 4 or via some other data binding method. Then, in step 708, following the metadata binding operation, the content and bounded valuation metadata is advantageously processed as a single data storage item, e.g., as a single object with a unique identifier.

Figure 7B:
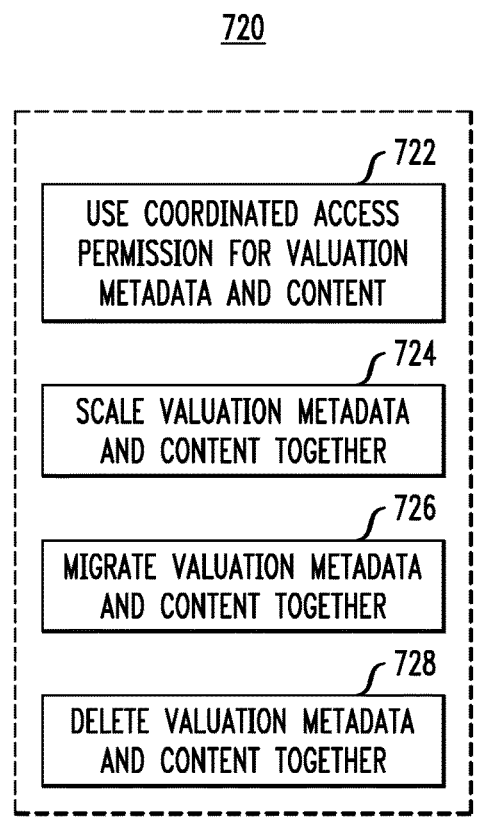
FIG. 7B illustrates examples of processing content and bound valuation metadata, according to an embodiment of the invention.

FIG. 7B illustrates examples of processing content and bound valuation metadata (e.g., step 708 in FIG. 7A), according to an embodiment of the invention. By way of example only, and as shown in FIG. 7B, metadata binding functionality enables a data storage system 720 to: (i) use the coordinated access permission for the valuation metadata and content (722); scale valuation metadata and content together (724); migrate valuation metadata and content together (726); and delete valuation metadata and content together (728). One of ordinary skill in the art will realize other processing advantages that flow from metadata binding functionality in accordance with illustrative embodiments of the invention. Such processing advantages are realized given that the content and valuation metadata is stored as a single data storage item (e.g., data object) within the data storage environment. Thus, in accordance with illustrative embodiments, the content and bound valuation metadata is stored in the same data structure and the same storage device.

Figure 8:
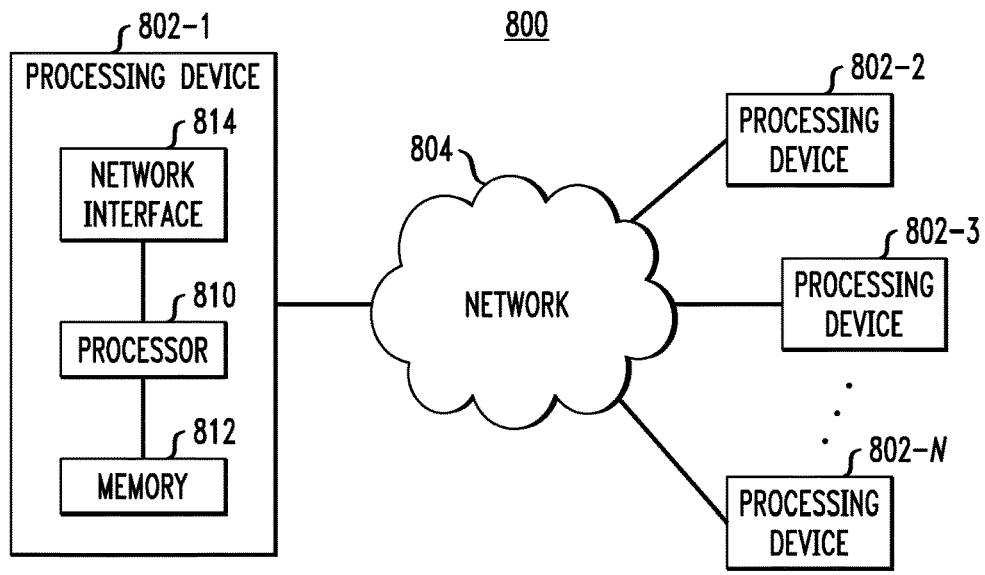
FIG. 8 illustrates a processing platform used to implement a data valuation framework with metadata binding functionality and embedded valuation, according to an embodiment of the invention.

As an example of a processing platform on which a data storage and valuation framework environment (as shown in FIGS. 1-7B) according to illustrative embodiments can be implemented is processing platform 800 shown in FIG. 8. The processing platform 800 in this embodiment comprises a plurality of processing devices, denoted 802-1, 802-2, 802-3, . . . 802-N, which communicate with one another over a network 804. It is to be appreciated that the data valuation methodologies described herein may be executed in one such processing device 802, or executed in a distributed manner across two or more such processing devices 802. Thus, the framework environment may be executed in a distributed manner across two or more such processing devices 802. The various functionalities described herein may be executed on the same processing devices, separate processing devices, or some combination of separate and the same (overlapping) processing devices. It is to be further appreciated that a server, a client device, a computing device or any other processing platform element may be viewed as an example of what is more generally referred to herein as a "processing device." As illustrated in FIG. 8, such a device comprises at least one processor and an associated memory, and implements one or more functional modules for instantiating and/or controlling features of systems and methodologies described herein. Multiple elements or modules may be implemented by a single processing device in a given embodiment.

The processing device 802-1 in the processing platform 800 comprises a processor 810 coupled to a memory 812. The processor 810 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 810. Memory 812 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 812 may comprise electronic memory such as random access memory (RAM), read-only memory (ROM) or other types of memory, in any combination. The one or more software programs when executed by a processing device, such as the processing device 802-1, causes the device to perform functions associated with one or more of the components/steps of system/methodologies in FIGS. 1-7B. One skilled in the art would be readily able to implement such software given the teachings provided herein. Other examples of processor-readable storage media embodying embodiments of the invention may include, for example, optical or magnetic disks.

Processing device 802-1 also includes network interface circuitry 814, which is used to interface the device with the network 804 and other system components. Such circuitry may comprise conventional transceivers of a type well known in the art.

The other processing devices 802 (802-2, 802-3, . . . 802-N) of the processing platform 800 are assumed to be configured in a manner similar to that shown for processing device 802-1 in the figure.

The processing platform 800 shown in FIG. 8 may comprise additional known components such as batch processing systems, parallel processing systems, physical machines, virtual machines, virtual switches, storage volumes, etc. Again, the particular processing platform shown in this figure is presented by way of example only, and the data valuation system and cloud infrastructure described herein may include additional or alternative processing platforms, as well as numerous distinct processing platforms in any combination.

Also, numerous other arrangements of servers, clients, computers, storage devices or other components are possible in processing platform 800. Such components can communicate with other elements of the processing platform 800 over any type of network, such as a wide area network (WAN), a local area network (LAN), a satellite network, a telephone or cable network, or various portions or combinations of these and other types of networks.

Furthermore, it is to be appreciated that the processing platform 800 of FIG. 8 can comprise virtual machines (VMs) implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 800 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

It was noted above that portions of the data valuation system and cloud environment may be implemented using one or more processing platforms. A given such processing platform comprises at least one processing device comprising a processor coupled to a memory, and the processing device may be implemented at least in part utilizing one or more virtual machines, containers or other virtualization infrastructure. By way of example, such containers may be Docker containers or other types of containers.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
    obtaining a data set;
    obtaining valuation metadata generated for the data set, wherein the valuation metadata comprises one or more values representing a worth of the data set respectively computed by one or more data valuation processes;
    binding the valuation metadata to the data set; and
    processing the data set and the bound valuation metadata as a single data storage item;
    wherein the steps are performed by one or more processing devices configured as part of a data storage environment, each processing device comprising a processor and a memory;
    wherein the processing step further comprises using coordinated access permission for the data set and the bound valuation metadata within the data storage environment;
    wherein the data storage environment is associated with one or more policies specifying, based at least in part on the one or more values representing the worth of the data set in the valuation metadata, at least one of (i) a data protection to be applied to the data set and (ii) a location within the data storage environment where the data set should be stored; and
    wherein the processing step further comprises modifying the valuation metadata bound to the data set, the modified valuation metadata triggering at least one of the one or more policies to modify at least one of (i) the data protection applied to the data set in the data storage environment and (ii) the location of the data set within the data storage environment.

2. The method of claim 1, wherein the processing step further comprises scaling the data set and the bound valuation metadata together as a single data storage item within the data storage environment.

3. The method of claim 1, wherein the processing step further comprises migrating the data set and the bound valuation metadata together as a single data storage item within the data storage environment.

4. The method of claim 1, wherein the processing step further comprises deleting the data set and the bound valuation metadata together as a single data storage item within the data storage environment.

5. The method of claim 1, wherein the processing step further comprises storing the data set and the bound valuation metadata together as a single data storage item within the data storage environment.

6. The method of claim 1, wherein the data set is represented as a data object.

7. The method of claim 6, wherein the binding step further comprises appending the valuation metadata to the data object.

8. The method of claim 7, wherein the data object with the appended valuation metadata is assigned a single unique object identifier within the data storage environment.

9. The method of claim 1, wherein the step of obtaining the valuation metadata for the data set further comprises generating the valuation metadata in real-time as the data set is obtained by the data storage environment.

10. The method of claim 9, wherein the real-time valuation metadata is generated at a time when and at a location where the data set enters the data storage environment.

11. The method of claim 1, wherein the step of obtaining the valuation metadata for the data set further comprises generating the valuation metadata as a background task within the data storage environment.

12. The method of claim 11, wherein the background valuation task is performed at a location where the data set is stored within the data storage environment.

13. An article of manufacture comprising a processor-readable storage medium having encoded therein executable code of one or more software programs, wherein the one or more software programs when executed by one or more processing devices configured as part of a data storage environment implement steps of:
    obtaining a data set;
    obtaining valuation metadata generated for the data set, wherein the valuation metadata comprises one or more values representing a worth of the data set respectively computed by one or more data valuation processes;
    binding the valuation metadata to the data set; and
    processing the data set and the bound valuation metadata as a single data storage item;
    wherein the processing step further comprises using coordinated access permission for the data set and the bound valuation metadata within the data storage environment;
    wherein the data storage environment is associated with one or more policies specifying, based at least in part on the one or more values representing the worth of the data set in the valuation metadata, at least one of (i) a data protection to be applied to the data set and (ii) a location within the data storage environment where the data set should be stored; and
    wherein the processing step further comprises modifying the valuation metadata bound to the data set, the modified valuation metadata triggering at least one of the one or more policies to modify at least one of (i) the data protection applied to the data set in the data storage environment and (ii) the location of the data set within the data storage environment.

14. The article of claim 13, wherein the processing step further comprises scaling the data set and the bound valuation metadata together as a single data storage item within the data storage environment.

15. The article of claim 13, wherein the processing step further comprises migrating the data set and the bound valuation metadata together as a single data storage item within the data storage environment.

16. A system comprising:
one or more processors operatively coupled to one or more memories as part of a data storage environment and configured to:
obtain a data set;
obtain valuation metadata generated for the data set, wherein the valuation metadata comprises one or more values representing a worth of the data set respectively computed by one or more data valuation processes;
bind the valuation metadata to the data set; and
process the data set and the bound valuation metadata as a single data storage item;
wherein the processing operation further comprises using coordinated access permission for the data set and the bound valuation metadata within the data storage environment;
wherein the data storage environment is associated with one or more policies specifying, based at least in part on the one or more values representing the worth of the data set in the valuation metadata, at least one of (i) a data protection to be applied to the data set and (ii) a location within the data storage environment where the data set should be stored; and
wherein the processing step further comprises modifying the valuation metadata bound to the data set, the modified valuation metadata triggering at least one of the one or more policies to modify at least one of (i) the data protection applied to the data set in the data storage environment and (ii) the location of the data set within the data storage environment.

17. The system of claim 16, wherein the processing operation further comprises scaling the data set and the bound valuation metadata together as a single data storage item within the data storage environment.

18. The system of claim 16, wherein the processing operation further comprises migrating the data set and the bound valuation metadata together as a single data storage item within the data storage environment.

19. The system of claim 16, wherein the processing operation further comprises deleting the data set and the bound valuation metadata together as a single data storage item within the data storage environment.

20. The system of claim 16, wherein the processing operation further comprises storing the data set and the bound valuation metadata together as a single data storage item within the data storage environment.

* * * * *